(No Model.)
C. R. MAYNE.
BICYCLE.
No. 520,796. Patented June 5, 1894.
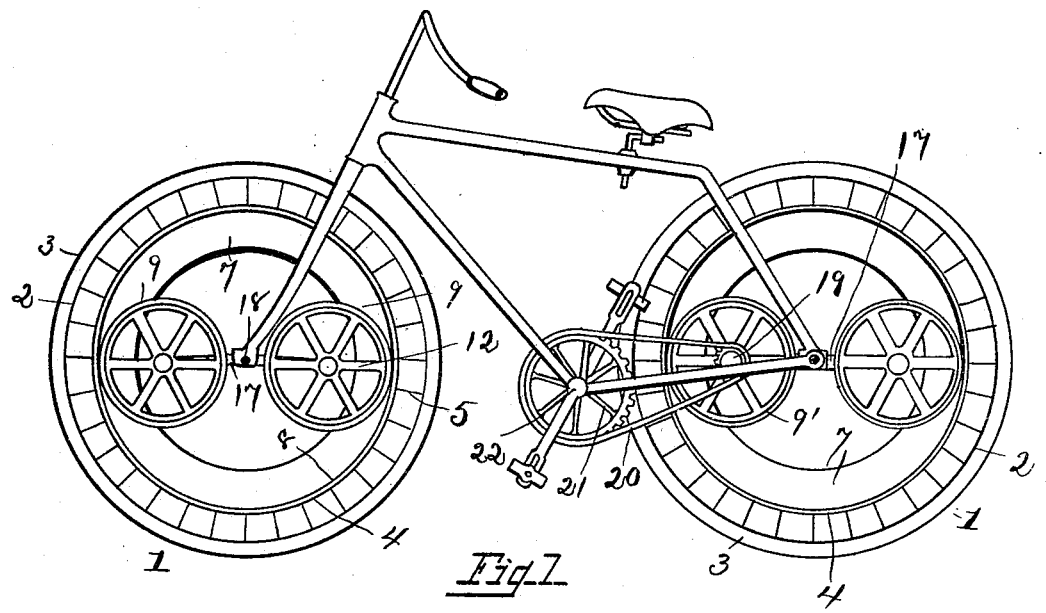
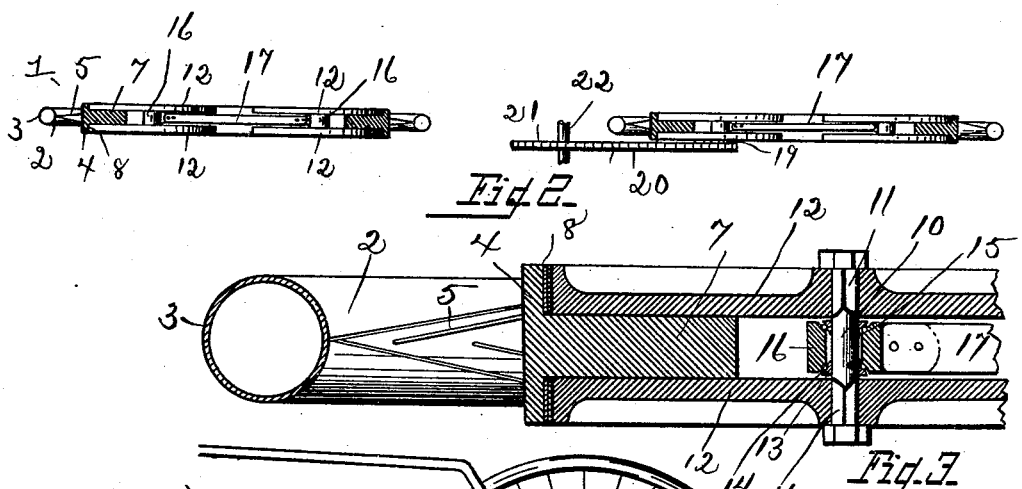
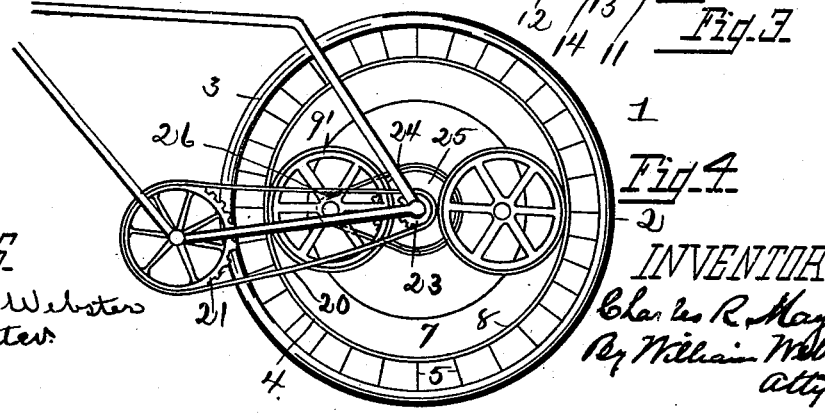
WITNESSES
Carroll J. Webster
F. R. Webster
INVENTOR
Charles R. Mayne
By William Webster
atty

UNITED STATES PATENT OFFICE.

CHARLES R. MAYNE, OF TOLEDO, OHIO.

BICYCLE.

SPECIFICATION forming part of Letters Patent No. 520,796, dated June 5, 1894.

Application filed July 17, 1893. Serial No. 480,725. (No model.)

*To all whom it may concern:*

Be it known that I, CHARLES R. MAYNE, of Toledo, county of Lucas, and State of Ohio, have invented certain new and useful Improvements in Bicycles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a bicycle, and has especial relation to the construction of the wheel, and the attachment of the frame thereto, whereby the application of power is removed from the axial center, and transferred to the periphery of a friction rim concentric to the tire, and also allowing for a flexibility of connection with the frame to obviate jar to the rider when the wheel contacts with uneven surfaces in the road bed.

The invention consists in the parts and combination of parts hereinafter described and pointed out in the claims.

In the illustration of my invention I have chosen the application thereof to a safety bicycle as best illustrating the same, and in its co-action have necessarily adapted the frame and power mechanism thereto, made certain novel changes in the frame that are of sufficient importance to be made the subject matter of combination claims, it being understood that while I shall specifically claim the combination of the elements united in this organized form, I wish to broadly claim the wheel as adapted to any form of conveyance, and a claim to the attachment of the bicycle frame is to be considered as the equivalent of the adaptation of a running gear of a conveyance of any character to the wheels.

In the drawings: Figure 1 is a side elevation of a safety bicycle constructed for application to my improved wheel. Fig. 2 is a sectional plan view of the road and planet wheels, showing the sprocket wheels by which to revolve the rear planet wheel, this view being taken at a point central of the road and planet wheels as illustrated in Fig. 1. Fig. 3 is a transverse section taken through the center of the front wheel, showing a portion of one of the planetary wheels and its connection with the friction ring, this view being shown on an enlarged scale. Fig. 4 is an elevation of the rear or driving wheel, and a speed gear connected with the planetary wheel by which to increase the speed of revolution of the driving wheel.

1 designates what I will term the road wheels, which comprise the outer rim 2 preferably supplied with an elastic tire 3, and an inner rim 4 connected with the outer rim by means of staggered spokes 5. Rim 4 is formed with an outer periphery 6 preferably of slightly greater width than rim 2, and upon the inner periphery with a radial central rib or flange 7 and annular bearings 8 upon each side of the flange.

9 designates the planet wheels comprising an axle having a central portion 10 round in cross section, and squared ends 11 upon which are secured friction disks 12, which bear closely against flange 7 upon each side, and bear frictionally upon bearings 8 of rim 4. Upon the central portion 10 of the axle is secured conical bearings 13 grooved annularly to receive anti-friction balls 14 which also have a bearing in concentric groove 15 formed in a box 16 which surrounds the axle, and to the boxing is secured one end of a spring bar 17, the opposite end of which is secured in a like boxing in a similar wheel journaled within the rim upon the opposite side. By this construction each road wheel comprises the rim concentric therewith, and the two planet wheels journaled in the spring bar to frictionally contact with the friction rim at the horizontal diametric line upon each side of the flange, and be steadied thereby, with a yielding connection between the planetary wheels having ball bearings to reduce the friction to a minimum.

In adapting the wheel to a bicycle, the front forks are secured one upon each side of the bar 17 by means of a transverse bolt 18, and the rear end of the frame is secured to the bar of the rear wheel in a like manner, so that the rider is relieved of the jar due to the contact of either wheel with the uneven surfaces in the road bed. One of the planet wheels 9' is the driver, and has a sprocket wheel 19 secured upon its axle to receive a sprocket chain 20 upon sprocket wheel 21, upon the pedal shaft 22, whereby power is communicated to wheel 9' and to the annular portion of the rear wheels, thereby propelling the bicycle.

In Fig. 4 is illustrated a form of speed gearing comprising the wheel 21 and a wheel 23 of smaller diameter upon an axle journaled centrally of the length of the bar, and connected by chain 20, and the wheel 9' geared therewith by means of a belt 24 running over a wheel 25 upon the axle of wheel 23, and a smaller wheel 26 upon the axle of wheel 9'. It will be apparent that this arrangement may be varied greatly to insure any increase of speed desired.

Rim 4 may be cast solidly of metal or with a metal rim, and wooden flange, or molded out of wood pulp or formed of wood or any preferred material, and in order to increase the friction between the planet wheels and bearings 8 either the wheels or bearings, or both may be covered with rubber, or other frictional bearing 27. (See Fig. 3.)

In transferring the power through wheel 9' to the periphery of the friction rim there is a decided gain of power over the ordinary form of bicycles in which the chain wheel is on the wheel axle.

It will be apparent that vehicle wheels may be constructed in accordance with my invention, whereby the gear may be supported upon the spring bars and obtain all the advantages of the yielding support to the rider.

What I claim is—

1. In a wheel in a frame, an outer rim or tire, an inner rim concentric therewith, said rim consisting of a central and side flanges, planet wheels arranged to straddle the central flange, and bear upon the side flanges, and a spring bar connecting the said wheels and adapted to support the frame.

2. In a bicycle, a frame, spring bars connected to the front and rear forks of the same, planet wheels journaled at the end of each spring bar, the road wheels consisting of the inner and outer concentric rims, the planet wheels contacting with the inner rims, a sprocket wheel upon one of the planet wheels and means for driving the same whereby the bicycle is propelled.

3. In a bicycle, road wheels, each formed with a rim, a rim concentric thereto having a central flange and side bearings, planet wheels journaled in the rim each upon an axle, a spring bar connecting the wheels and journaled upon the axle and a frame supported upon the spring bars.

In testimony that I claim the foregoing as my own I hereby affix my signature in presence of two witnesses.

CHARLES R. MAYNE.

Witnesses:
WILLIAM WEBSTER,
F. R. WEBSTER.